United States Patent [19]

Robeson et al.

[11] Patent Number: 4,831,226

[45] Date of Patent: May 16, 1989

[54] CONTROL SYSTEM WITH HIDDEN REPROGRAMMING SWITCH

[75] Inventors: John D. Robeson; Roger W. Carlson; Rex E. Fritts, all of Cedar Rapids, Iowa

[73] Assignee: Amana Refrigeration, Inc., Amana, Iowa

[21] Appl. No.: 153,752

[22] Filed: Feb. 8, 1988

[51] Int. Cl.⁴ ................................................. H05B 9/06
[52] U.S. Cl. ...................... 219/10.55 B; 219/10.55 M; 364/189
[58] Field of Search ................. 219/10.55 B, 492, 506, 219/10.55 M; 340/309.3, 309.4, 328, 365 R, 365 A, 365 C, 825.36; 364/189

[56] References Cited

U.S. PATENT DOCUMENTS 4,011,428  3/1977  Fosnough ..................... 219/10.55 B
4,345,145  8/1982  Norwood ............................ 219/492
4,431,393  2/1984  Levie ........................... 219/10.55 B Primary Examiner—A. D. Pellinen
Assistant Examiner—Leon K. Fuller
Attorney, Agent, or Firm—William R. Clark; Richard M. Sharkansky

[57] ABSTRACT

A commercial microwave oven having a plurality of operator actuable switches each of which is dedicated to activating the microwave oven for a corresponding programmed time period. These operator actuable switches are located on a switchboard, and a front faceplate has graphic keypads indicating where to push to activate the respective switches. Also located on the switchboard are operator actuable switches used to reprogram the time periods, but these reprogramming switches are hidden because they do not have corresponding keypads on the faceplate. Accordingly, access to the reprogramming feature is limited to those who have been appropriately instructed.

16 Claims, 2 Drawing Sheets

CONTROL SYSTEM WITH HIDDEN REPROGRAMMING SWITCH

BACKGROUND OF THE INVENTION

The field of the invention generally relates to a programmable control system such as for a microwave oven, and more particularly relates to such a control system that limits the users who can reprogram the control functions.

Commercial microwave ovens are in widespread usage such as in restaurants and in vending machine areas in business and public buildings. Generally, commercial microwave ovens have a plurality of numerically labelled keypads each of which is dedicated to a particular control function which is to actuate the microwave oven for a programmed time period. For example, the "1" keypad may activate the microwave oven for 12 seconds, and instructions might indicate that this keypad should be used for pastry rolls. Also, the "2" keypad may activate the oven for 22 seconds, and instructions might indicate that this keypad should be used for small sandwiches. Further, the "3" keypad may activate the microwave oven for 42 seconds, and instructions might indicate that this keypad should be used for hamburgers and pies.

The owner of a commercial microwave oven may want to reprogram time periods associated with various keypads for any one of a number of reasons. For example, he may add to his vending machines a food product that requires a cooking time period that is not already provided as a control function of one of the present keypads. Also, he may receive complaints that a particular food category comes out too hot or too cold, and it may be necessary to adjust the cooking time either down or up.

As is well known, it is important that the general users not have access to the feature of reprogramming the time periods associated with the keypads. If such were the case, users could inadvertently or intentionally tamper with the cooking times thereby creating a significant problem for the owner of the commercial microwave oven. Accordingly, prior art commercial microwave ovens have complicated procedures for reprogramming the time periods, and these procedures may involve an expensive service call so that the control panel can be removed by a trained technician.

SUMMARY OF THE INVENTION

It is an object of the invention to provide an improved control system that can readily be reprogrammed, but only by those who have been properly instructed.

It is also an object to provide a reprogrammable control system that can readily and easily be reprogrammed by the owner, while user access to the reprogramming feature is prevented.

It is a further object to provide a control system that has reprogramming switches that are not visibly identifiable with keypads.

It is a further object to provide a control, such as for a commercial microwave oven, that has hidden switches for reprogramming the time periods associated with dedicated keypads.

These and other objects are provided by the invention which defines a control system comprising a switchboard having first and second operator actuable switches, means responsive to the first operator actuable switch for providing a predetermined control function, the providing means comprising means responsive to the second operator actuable switch for changing the predetermined control function provided by the first operator actuable switch, and a faceplate covering the switchboard wherein the faceplate comprises means for locating the position of the first operator actuable switch and means for hiding the position of the second operator actuable switch. It may be preferable that the locating means comprise a keypad corresponding to the position of the first operator actuable switch behind the faceplate, and that the hiding means comprise a portion of the faceplate without a corresponding keypad in front of the second operator actuable switch.

The predetermined control function may, for example, define the activation of a device such as a magnetron for a programmed time period. In other words, if the first switch is closed, the magnetron of a microwave oven may be energized for a specific time period such as, for example, one minute. Both the first and second operator actuable switches are behind the faceplate where they are not visible to the user. Although there is a keypad on the faceplate indicating where to push to close the first operator actuable switch, there is not a corresponding keypad in front of the second operator actuable switch. In other words, the second operator actuable switch is hidden from the user such that only those with prior knowledge of its location or even its existence can reprogram the control function of the first switch.

BRIEF DESCRIPTION OF THE DRAWINGS

The foregoing objects and advantages will be more fully understood by reading the description of the preferred embodiment with reference to the drawings wherein.

DESCRIPTION OF THE PREFERRED EMBODIMENT

Figure 1:
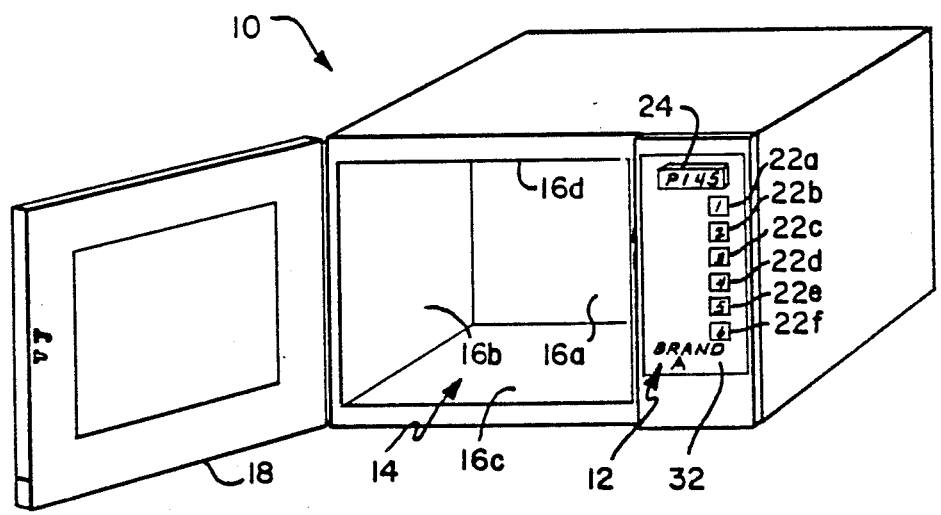
FIG. 1 is a perspective view of a commercial microwave oven using the inventive control system to advantage.

With general reference to the drawings, there is disclosed a control system 12. In the operating mode, any one of a plurality of operator actuable control switches 36a-f is closed and, in response thereto, controller 46 provides a predetermined programmed control function. In a reprogramming mode, at least one operator actuable reprogramming switch 38a or b is closed to reprogram or alter the programmed control functions of control switches 36a-f. A faceplate 32 covers the switchboard 34 upon which the control switches 36a-f and reprogramming switches 38a and b are mounted. In accordance with the invention, keypads 22a-f are provided on the faceplate to identify the locations of the control switches 36a-f, but there are no corresponding indicia to indicate the locations or even the existence of reprogramming switches 38a and b. Accordingly, reprogramming of the control functions corresponding to control switches 36a-f is limited to those who have been properly instructed. As a result, inadvertent or intentional tampering of the control functions by unauthorized personnel is avoided.

With specific reference to FIG. 1, there is shown microwave oven 10. Although the control system 12 in accordance with the invention can be practiced in many applications including outside the field of microwave ovens, the invention is here used to advantage in a commercial microwave oven 10 which includes a microwave cavity 14 defined by back wall 16a, side walls 16b, floor 16c, ceiling 16d, and a door 18. In response to control system 12, magnetron 20 (FIG. 3) is activated to energize cavity 14 with microwave energy for a predetermined time period. More specifically, in the operating mode, the operator pushes one of the six numerically designated keypads 22a-f or control pads and, in response thereto, the control system 12 executes a programmed control function which defines activation of the magnetron for a predetermined programmed time period. For example, instructions may generally be provided which identify various cooking categories or food types with a specific keypad 22a-f or touch pad. For example, keypad 22a, which is here designated "1", may be identified with pastry rolls. Accordingly, after placing a pastry roll into cavity 14 and closing door 18, the operator presses keypad 22a. A typical programmed control function or cooking program for keypad 22a might be to activate the microwave oven for 12 seconds. Also, keypad 22b, which is designated "2", may be identified with small sandwiches. In such case, keypad 22b may be programmed to activate the microwave oven for a time period such as, for example, 22 seconds. Further, keypad 22c, which is designated "3", may operate the microwave oven for 42 seconds, and be used for cooking hamburgers and pies. Although six keypads 22a-f for six programmed control functions or cooking programs are shown here, it will be apparent that more or fewer control functions could be used in this or other applications.

When a control function or cooking program is commenced by pushing the appropriate keypad 22a-f, the programmed cooking time for that particular keypad 22a-f is indicated in digital display 24, and that time period is counted down until completion of the programmed or specified control function. At zero time, an audible alarm may be used to indicate completion of the control function.

Figure 2:
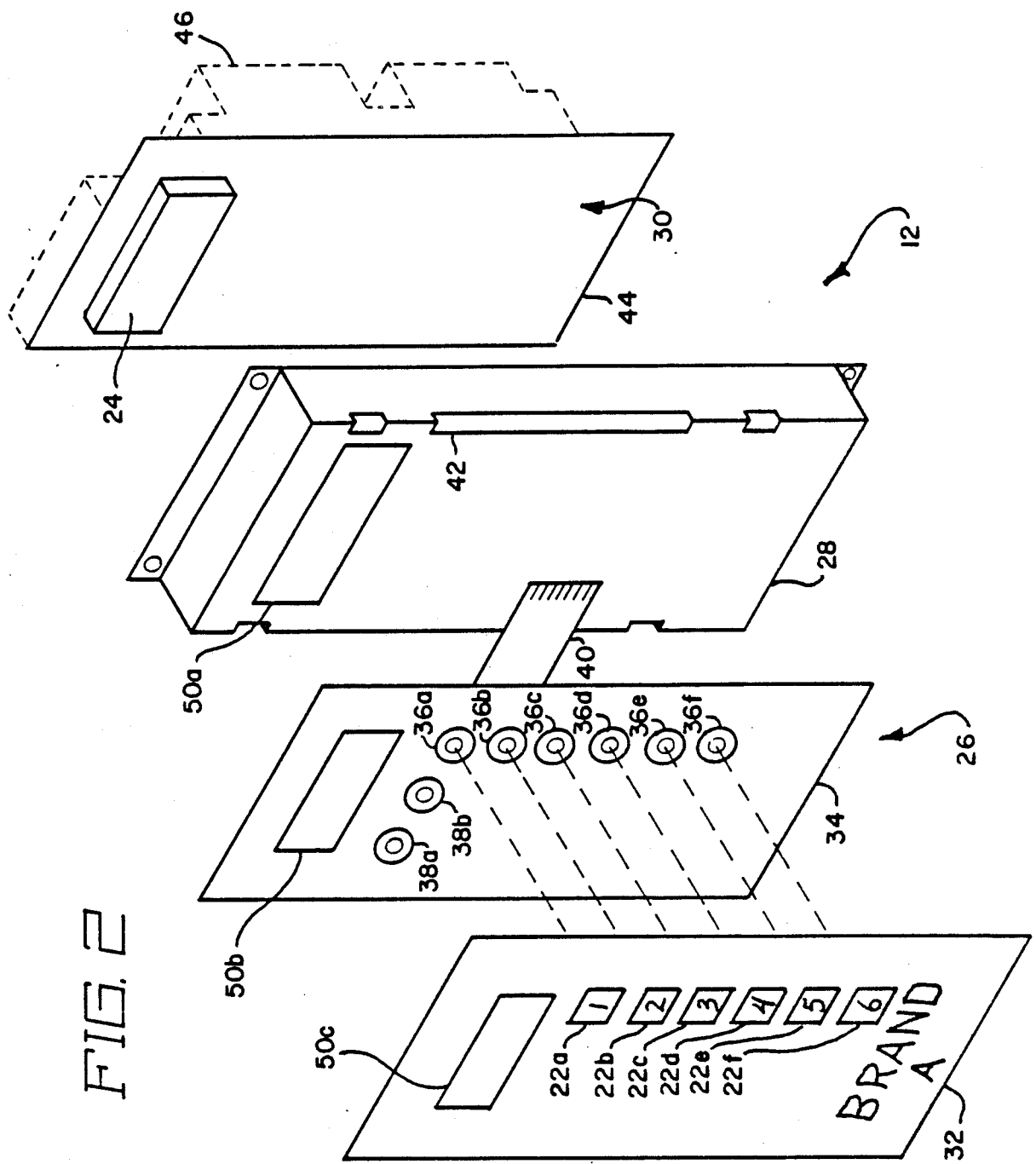
FIG. 2 is an exploded perspective view of the control system.

Also referring to FIG. 2, there is shown an exploded perspective view of control section 12 which includes keyboard assembly 26, mounting bracket 28, and control board 30. The keyboard assembly 26 includes a faceplate 32 or a graphics film overlay and switchboard 34 or keyboard.

Switchboard 34 is of conventional construction. Although switches 36a-f and 38a and b are here described as membrane or micro-motion switches, other types of switches such as capacitive switches could be used. As described earlier, control switches 36a-f each correspond with a specific and unique control function which is here defined as activating the magnetron 20 for a programmed time period. As will be described heretofore, reprogram switches 38a and b are used to reprogram the control functions associated with control switches 36a-f. As is conventional, each control switch 36a-f and reprogramming switch 38a and b is connected through a ribbon lead 40 that extends through slot 42 in bracket 28 to control board 30.

Control board 30 here includes a printed circuit board 44 having digital display 24 mounted on the front side, and the controller 46 on the back side. In final assembly, control board 30 seats into mounting bracket 28 with digital display 24 extending through corresponding apertures 50a-c in bracket 28 and keyboard assembly 26. Although various types of control circuits and control logic in accordance with the description herein could be used, here controller 46 includes a microprocessor 48 (FIG. 3) and associated interface components (not shown).

Figure 3:
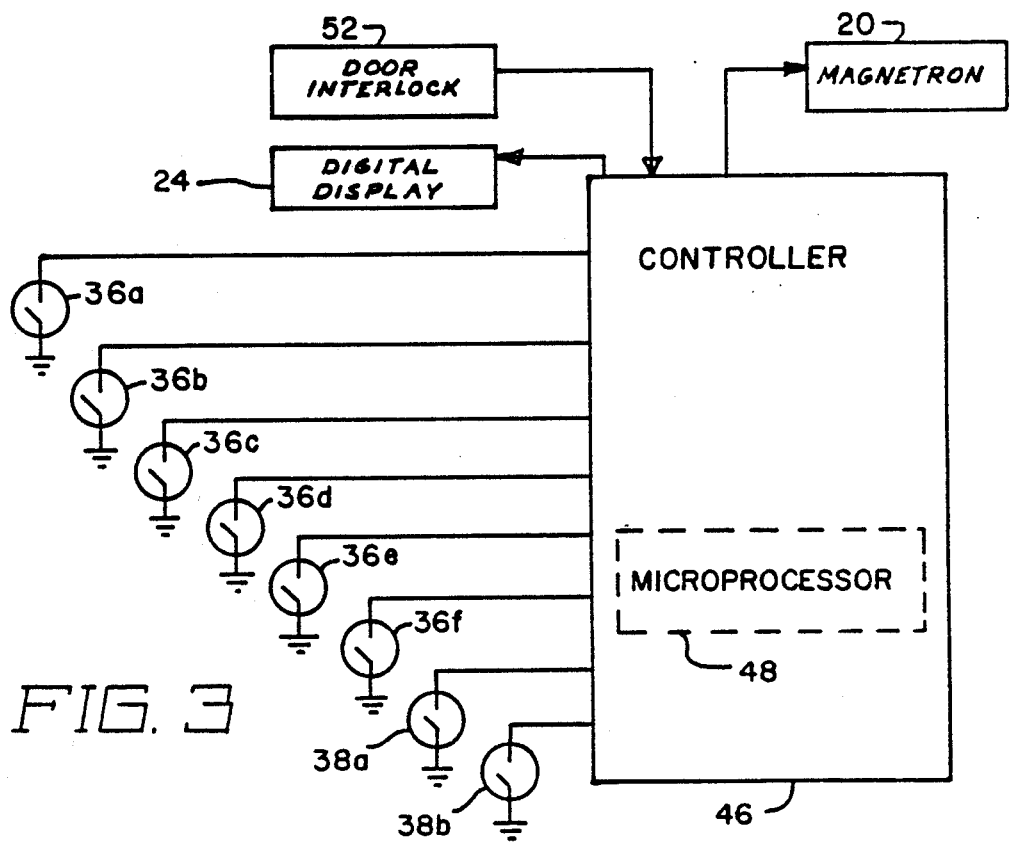
FIG. 3 is an electrical schematic of the control system.

Also referring to FIG. 3, a schematic diagram of control system 10 is shown. One side of each switch 36a-f and 38a and b is connected to ground, and the opposite side is sequentially scanned at a high rate by cotroller 46 to determine if one of the switches has been pushed to the closed position. As described before, control switches 36a-f each initiates a particular and unique control function, here defined as activating magnetron 20 for a programmed time period, provided door interlock 52 is closed. Once a control function (e.g. cook for 42 seconds) has been commenced, controller 46 will not accept any other control function inputs from the other switches 36a-f.

Switches 38a and b are here used to program or reprogram the time periods or control function of any one of the control switches 36a-f. First, however, the program or reprogramming mode must be entered This is done by opening door 18 so that door interlock 52 is open, and then continuously pressing or closing switch 36a for an extended period of time such as, for example, 15 seconds. After these two steps, a P is displayed in the most significant digit of digital display 24 indicating that the program mode has been entered. The next step is for the operator to press or close the control switch 36a-f for which a new control function (e.g. cooking time) is to be specified. In response thereto, controller 46 displays the time period currently stored or specified as the control function for the selected switch 36a-f. Preferably, digital display 24 has enough digits, such as a cook level digit, so that the selected control switch 36a-f can also be displayed. More specifically, it is preferable to provide the operator with a status indicating which control switch 36a-f is being reprogrammed. Upon the pressing or closing either switch 38a or b, the minutes and seconds of the programmed time period for the selected control switch 36a-f is reset to zero. Then, for each push of switch 38a, the minutes or second most significant digit of the display is incremented by one (1) minute. Also, for each push of switch 38b, the seconds or least significant two digits are incremented by five (05) seconds. The operator continues to increment the minutes and seconds until the desired cooking time period for that control switch 36a-f or control function is displayed. Then, any other control switch 36a-f may be programmed by following the same procedure. Upon pushing any other control switch 36a-f, the displayed time is stored in the controller for the appropriate control switch 36a-f, and the reprogramming of that switch is completed.

Referring again to FIG. 2, switchboard 34 is covered by faceplate 32 or graphics film overlay. As can be seen, keypads 22a-f which respectively have graphic indicia labels 1-6 are respectively aligned to correspond with control switches 36a-f. Accordingly, these keypads 22a-f identify the location positions of control switches 36a-f behind faceplate 32. Faceplate 32 is flexible, so when the operator pushes on any one of keypads 22a-f, the corresponding control switch 36a-f is closed and the corresponding programmed control function is commenced.

Still referring to FIG. 2 and in accordance with the invention, faceplate 32 or graphics panel does not have keypads corresponding with programming or reprogramming switches 38a and b. Accordingly, the position of programming switches 38a and b or even their existence is not readily apparent to the uninitiated user. In short, programming switches 38a and b are hidden from the casual user. Accordingly, in an application such as a restaurant or vending machine area, the owner of commercial microwave oven 10 can program each of control switches 36a–f to provide a specified control function such as, for example, activating a cooking task for 12 seconds, 22 seconds, 42 seconds, etc. Later, if the owner wishes to change any of the control functions for any reason such as, for example, as a new menu or a food item becomes available, it is a simple procedure for him to reprogram the control functions of control switches 36a–f so long as the location and operation of programming switches 38a and b are known. However, because programming switches 38a and b are hidden, the every-day user is prevented from accessing the reprogramming mode and thereby inadvertently or intentionally altering the control functions as programmed by the owner. Following the procedure described above, the owner can reprogram the control functions without having to pay for an expensive service call by a trained technician. In other words, with knowledge of the location of switches 38a and b and their operation, the owner can easily and readily reprogram the control functions without removing the control system 12 for accessing an internal switch.

As shown in FIG. 2, BRAND A is written on the faceplate 32. Switches 38a and b could respectively be positioned directly behind the R and N of BRAND, and the owner could be instructed to activate switch 38a by pressing R and 38b by pressing N. Stated differently, the location of reprogramming switches 38a and b can be indicated by identifiable faceplate landmarks that are not readily recognizable as keypads by the casual user. In an alternate embodiment, faceplate 32 could be totally unmarked or blank in the region in front of programming switches 38a and b, and their locations could be identified by a description or a drawing in the owners manual. In any event, programming switches 38a and b are hidden in that they do not have corresponding keypads or other recognizable indicia on faceplate 32.

This concludes the description of the preferred embodiment. However, it will now be apparent to one of skill in the art that other embodiments incorporating its concept may be used without departing from the spirit and scope of the invention. Accordingly, it is intended that the scope of the invention be limited only by the appended claims.

What is claimed is:

1. A control system comprising:
   a switchboard having first and second switches each of which is actuable by operator pressing:
   a controller providing a predetermined control function in response to actuation of said first switch;
   said controller comprising means responsive to actuation of said second switch for changing the predetermined control function provided by actuation of said first switch; and
   a flexible faceplate covering said first and second switches on said switchboard wherein said first and second switches are actuable by pressing on said face plate without removing said faceplate, said comprising indicia means identifying the location of said first switch behind said faceplate, said faceplate further comprising means for hiding the location of said second switch.

2. The control system recited in claim 1 wherein said indicia means comprises a keypad corresponding to the position of said first switch behind said faceplate.

3. The control system recited in claim 1 wherein said hiding means comprises a portion of said faceplate without a corresponding keypad in front of said second operator actuable switch.

4. A control system comprising:
   a switchboard having first and second switches each of which is actuable by operator pressing;
   a controller providing a programmed control function in response to actuation of said first switch;
   said controller comprising means responsive to said second switch for reprogramming said programmed control function provided by actuation of said first switch;
   a flexible faceplate covering said first and second switches on said switchboard, said first and second switches being actuable by pressing on a portion of said faceplate respectively in front of said first and second switches without removing said faceplate, said faceplate comprising an indicia for indicating the portion of said faceplate in front of said first switch; and
   the portion of said faceplate in front of said second switch being unmarked by corresponding indicia for concealing the existence and position of said second switch.

5. The control system recited in claim 4 wherein said indicia comprises a graphic keypad.

6. The control system recited in claim 4 wherein said controller comprises a microprocessor.

7. A control system, comprising:
   a switchboard having a plurality of control switches each actuable by operator pressing:
   a flexible faceplate covering said switchboard wherein each of said control switches is actuable by pressing on a corresponding portion of said faceplate in front of each of said respective control switches, said faceplate having a corresponding touch pad in front of each of said plurality of control switches to indicate where to push to activate each of said control switches;
   a controller providing a like plurality of corresponding programmed control functions each being in response to activation of a corresponding one of said control switches; and
   means for reprogramming said programmed control functions, said reprogramming means comprising at least one reprogramming switch actuable by operator pressing, said reprogramming switch being on said switchboard hidden behind said flexible faceplate and being actuable by pressing on the portion of said faceplate in front of said reprogramming switch, said portion on said faceplate in front of said reprogramming switch being unidentified by a corresponding touch pad on said faceplate.

8. The control system recited in claim 7 wherein said control functions are microwave oven cooking programs.

9. A microwave oven comprising:
   a microwave cavity having a door;
   a magnetron for energizing said microwave cavity;
   a switchboard having a plurality of control switches and at least one programming switch, each of said control switches and said programming switch being actuated by operator pressing;

a controller activating said magnetron for a programmed time period in response to actuation of each one of said control switches;

said controller being responsive to said programming switch for reprogramming the programmed time period corresponding to at least one of said control switches; and a flexible faceplate covering said control switches and said programming switch on said switchboard, said control switches and said programming switch being actuable by pressing on a portion of said faceplate in front of respective ones of said control and programming switches, said flexible faceplate having a keypad corresponding with each one of said control switches for indicating the position of said control switches behind said faceplate, said faceplate further having an unmarked portion in front of said programming switch for hiding the location of said programming switch for limiting access to reprogramming.

10. The microwave oven recited in claim 9 wherein said controller is further responsive to said door being open for reprogramming one of said programed time periods.

11. The oven recited in claim 9 further comprising a second programming switch having an unmarked portion of said faceplate in front thereof, said one programming switch programming the minutes of one of said time periods and said second programming switch programing seconds of said one time period.

12. The oven recited in claim 11 wherein said control switches and said programming switches are membrane switches.

13. The oven recited in claim 9 wherein said keypads are graphic numerals.

14. The method of reprogramming a microwave oven controller having a plurality of programmed control functions each corresponding to activating the magnetron for a predetermined time period, each of said control functions being initiated in response to a corresponding dedicated one of a plurality of operator actuable membrane control switches positioned on a board behind a flexible faceplate having indicia designating the location of said control switches wherein each of said control switches is actuated by the operator pressing the indicia on the flexible faceplates in front of the corresponding switch, comprising the steps of:

pushing the indicia on the faceplate to cause the one of said control switches to be reprogrammed; and incrementally pushing on a portion of said flexible faceplate unmarked by corresponding indicia to actuate a programming membrane switch on said board hidden behind said faceplate.

15. The method recited in claim 14 further comprising the step of opening the door of said microwave oven.

16. The method recited in claim 14 further comprising the step of pushing one of said control switches for a predetermined time period.

* * * * *